US005426126A

United States Patent [19]

Gebauer et al.

[11] Patent Number: 5,426,126

[45] Date of Patent: Jun. 20, 1995

[54] LIQUID, LIGHT-COLORED POLYISOCYANATE MIXTURES AND A PROCESS FOR THEIR PRODUCTION

[75] Inventors: Herbert Gebauer, Krefeld; Pramod Gupta, Bedburg; Martin Hoppe, Leverkusen; Rolf Wiedermann, Odenthal-Voiswinkel, all of Germany

[73] Assignee: Bayer Aktiengesellschaft, Leverkusen, Germany

[21] Appl. No.: 998,190

[22] Filed: Dec. 30, 1992

[30] Foreign Application Priority Data

Jan. 7, 1992 [DE] Germany ........................ 42 00 157.9

[51] Int. Cl.$^6$ ........................ C08J 9/00

[52] U.S. Cl. ........................ 521/131; 521/137; 521/159; 521/160; 528/66; 528/76

[58] Field of Search ............... 521/131, 137, 159, 160; 528/66, 76

[56] References Cited

U.S. PATENT DOCUMENTS

| | | | |
|---|---|---|---|
| 4,365,025 | 12/1982 | Murch et al. | 521/159 |
| 4,945,117 | 7/1990 | Gansen et al. | 521/99 |
| 5,028,637 | 7/1991 | Milliren | 521/159 |

FOREIGN PATENT DOCUMENTS 320134 6/1989 European Pat. Off. .

OTHER PUBLICATIONS

Webster's New Collegiate Dictionary, pp. 386–387.

Chemical Abstracts, vol. 109, No. 18, Abstract No. 55878s.

Chemical Abstracts, vol. 100, No. 18, Abstract No. 140234n.

Chemical Abstracts, vol. 115, No. 18, Abstract No. 184944h.

*Primary Examiner*—Samuel A. Acquah

*Attorney, Agent, or Firm*—Joseph C. Gil; Lyndanne M. Whalen

[57] ABSTRACT

An isocyanate terminated prepolymer based upon diphenylmethane isocyanates. This prepolymer is the reaction product of a diphenylmethane isocyanate mixture having from about 75 to about 95 wt % binuclear isomers and from about 5 to about 25 wt % polymeric isocyanate with a polyether polyol. The binuclear isomer content is generally from about 15 to about 40 wt % 2,4'-isomer and from about 2 to about 10 wt % 2,2'-isomer. The polyether polyol has a functionality of from about 3 to about 8, an OH number of from about 350 to about 1000 mg KOH/g and a molecular weight of from about 150 to about 1000. These prepolymers are particularly useful as starting materials for the production of light-colored, dimensionally stable rigid polyurethane foams.

7 Claims, No Drawings

LIQUID, LIGHT-COLORED POLYISOCYANATE MIXTURES AND A PROCESS FOR THEIR PRODUCTION

BACKGROUND OF THE INVENTION

The present invention relates to new, light-colored, urethane-modified polyisocyanates or polyisocyanate mixtures of the diphenylmethane series, a process for their production and the use of these modified polyisocyanates in the production of light-colored, tough and rigid polyurethane foams.

In the production of polyurethane foams, especially polyurethane rigid foams, polyisocyanates or polyisocyanate mixtures of the diphenylmethane series (MDI) have for many years been used as a polyisocyanate component. In the production of rigid polyurethane foams, polyisocyanate mixtures of the diphenylmethane series that have a mean NCO functionality of from about 2 to about 3.1 are preferably used. These have the disadvantage, however, of being unsuitable for the production of light-colored polyurethane foams.

The term "polyisocyanate of the diphenylmethane series" as used herein is the generic term for all di- and polyisocyanates formed by the phosgenation of aniline/formaldehyde condensates and present in the phosgenation product.

The term "polyisocyanate mixture of the diphenylmethane series" as used herein includes any mixture of "polyisocyanates of the diphenylmethane series". The phosgenation products of aniline/formaldehyde condensates, mixtures obtained by combining individual "polyisocyanates of the diphenylmethane series" and/or different mixtures thereof and also mixtures of "polyisocyanates of the diphenylmethane series" generated as distillate or distillation residue during partial distillation of phosgenation products of aniline/formaldehyde condensates.

Distilled MDI types, that is fractions with a high content of binuclear products (4,4'-isomeric MDI) or those with as low as possible a content of polynuclear isocyanates would, in principle, also be useful for the production of light-colored polyurethane foams. It is the polynuclear isocyanates of the MDI series as well as isocyanates with still higher molecular weights which produce foamed plastics having a yellowish discoloration. Color problems in polymers based on polyisocyanates of the MDI series are known from the literature.

Light-colored foamed plastics based on polyisocyanates of the MDI series have, until now, been produced only with difficulty. GB 2,207,671, U.S. Pat. No. 4,465,639 and U.S. Pat. No. 4,876,380 describe such difficult processes for producing light-colored plastics.

Isocyanates of the MDI series having a high binuclear content unfortunately have too high a reactivity and too low a functionality (absence of the polynuclear components) to produce polyurethane rigid foams of large volume and sufficient dimensional stability. The use of isocyanates containing binuclear compounds with fairly high 2,4'- and 2,2'-isomer contents, which have a suitable reactivity, is also impractical due to their low functionality. Rigid foams produced from isocyanates having such low functionality exhibit shrinkage problems which preclude their use.

Light-colored polyurethane resins are required wherever semi-opaque skins are applied together with a foamed plastic. For example, light colored resins are desirable for use in containers or vehicle bodywork with polyester skins, surfboards and refrigerators with internal plastic containers.

It is known from the literature that for applications in the field of semi-opaque skins, prepolymers based on tolylene diisocyanate (so-called TDI-prepolymers) permit the production of white, rigid foams. Nevertheless, the use of prepolymers based on tolylene diisocyanate (TDI prepolymers) is made increasingly difficult due to industrial hygiene considerations.

SUMMARY OF THE INVENTION

It is an object of the present invention to provide prepolymers that permit light-colored, dimensionally stable polyurethane rigid foams to be produced subject to industrial hygienic and ecological criteria.

It is also an object of the present invention to provide a process for the production of prepolymers which will produce light-colored, dimensionally stable rigid polyurethane foams.

It is a further object of the present invention to provide a process for the production of light-colored, dimensionally stable rigid polyurethane foams.

These and other objects which will be apparent to those skilled in the art are accomplished by reacting a) a diphenylmethane isocyanate mixture having 75–95 wt % binuclear isomers of which 15–40 wt % is a 2,4'-isomer and 2–10 wt % is a 2,2'-isomer and 5–25 wt % polymeric isocyanate with b) 0.1–10 wt % polyether polyol having a functionality of from about 3 to about 8 with an OH number of 350–1000 mg KOH/g and a molecular weight of 150–1000. The resultant prepolymer may then be reacted with an isocyanate reactive material in the presence of a blowing agent to produce a dimensionally stable, light-colored, rigid polyurethane foam.

DETAILED DESCRIPTION OF THE PRESENT INVENTION

The present invention relates to urethane-group-containing polyisocyanates or polyisocyanate mixtures of the diphenylmethane series that are prepolymers. These prepolymers are the reaction product of isocyanates of the diphenylmethane series and polyether polyols. The isocyanates of diphenylmethane useful in the present invention have a binuclear isomer content of from about 75 to about 95 wt % with 2,4'-isomers being 15–40 wt % and 2,2'-isomers being 2–10 wt %. The remainder of the isocyanate component is from about 5 to about 25 wt % polymeric isocyanates of the diphenylmethane series. The polyether polyols useful in the present invention have a functionality of from about 3 to about 8, an OH number of 350–1000 mg KOH/g and a molecular weight of from about 150 to about 1000.

The prepolymers of the present invention are useful for the production of dimensionally stable, light-colored and tough polyurethane rigid foams in accordance with known techniques using any of the known isocyanate reactive materials. Blowing agents useful in the production of these dimensionally stable, light-colored and tough polyurethane rigid foams include halogen-containing blowing agents such as trichlorofluoromethane, chlorodifluoromethane, 1,1-dichloro-1-fluoroethane, 1-chloro-1,1-difluoroethane, 1,1-dichloro-2,2,2-trifluoroethane and mixtures thereof and halogen-free blowing agents such as $C_4$- to $C_8$-alkanes, primarily $C_5$-alkanes, and carbon dioxide.

The present invention also relates to a process for production of urethane-group-containing polyisocyanates or polyisocyanate mixtures of the diphenylmethane series, which is characterized in that a) isocyanates of the diphenylmethane series with a content of binuclear isomers of from about 75 to about 95 wt %, having from about 15 to about 40 wt % 2,4'-isomers and from about 2 to about 10 wt % 2,2'-isomers, and from about 5 to about 25 wt % polymeric isocyanates of the diphenylmethane series are reacted with b) from about 0.1 to about 10 wt %, relative to the total quantity, of polyether polyols having a functionality of from about 3 to about 8 with an OH number of from about 350 to about 1000 mg KOH/g and a molecular weight of from about 150 to about 1000. Preferably, 6–8 wt % polyether polyol, relative to the total quantity is used.

The isocyanates of the diphenylmethane series used in the reaction preferably have a content of binuclear isomers of about 85 wt %, the content of 2,4'-isomers being from about 20 to about 24 wt % and the content of 2,2'-isomers being from about 1 to about 5 wt %.

In the process of the present invention, it is preferred that the polyisocyanate component be charged to the reaction vessel and the polyether polyol subsequently added to the vessel containing polyisocyanate with agitation. The process is preferably conducted in the presence of an inert gas atmosphere. The process according to the invention is generally carried out between 40° and 140° C., preferably in the temperature range of from 40° to 80° C.

The reaction may be carried out continuously by metered addition of the polyether polyol component to a polyisocyanate stream.

The reaction mixture obtained by the process of the present invention may subsequently be mixed with further unmodified polyisocyanates or polyisocyanate mixtures of the diphenylmethane series. The second polyisocyanate component used for the mixing can be identical with the urethane-group-containing polyisocyanate according to the invention.

The invention will be explained in more detail with the aid of the following examples in which all parts and percentages are parts by weight and percentages by weight, unless otherwise indicated.

EXAMPLES

The polyether polyols used in these Examples were produced by known processes. The required amounts of starters (e.g. glycerol, pentaerythritol, sorbitol, sucrose or mixtures) were charged to a reaction vessel. Subsequently, using customary bases (e.g. NaOH or KOH), the epoxides were added at 100°–120° C. The product was neutralized and worked up by known methods.

The polyether polyols A–E, which are described in more detail in Table 1, were used in the Examples which follow.

TABLE 1

| | |
|---|---|
| Polyether polyol A: | produced by propoxylation of trimethylolpropane (TMP), using 0.33 mol propylene oxide per reactive hydrogen atom of the starter. |
| Polyether polyol B: | produced by propoxylation of sorbitol, using 1.624 mol propylene oxide per reactive hydrogen atom of the starter. |
| Polyether polyol C: | produced by propoxylation of pentaerythritol, using 1.172 mol propylene oxide per reactive hydrogen atom of the starter. |
| Polyether polyol D: | produced by propoxylation of trimethylolpropane, using 1.796 mol propylene oxide per reactive hydrogen atom of the starter. |
| Polyether polyol E: | produced by propoxylation of sorbitol, using 0.987 mol propylene oxide and 0.325 mol ethylene oxide per reactive hydrogen atom of the starter. |

Polyisocyanate 1, 2 or 3 was used in each of the Examples which follow. The composition of each of those polyisocyanates was as follows:

Polyisocyanate 1

Crude, undistilled phosgenation product of a polyamine mixture of the diphenylmethane series (produced according to U.S. Pat. No. 3,952,042, example 1) with 85 wt % diaminodiphenylmethane isomers of which about 60 wt % was 4,4'-diaminodiphenylmethane (MDA), about 22 wt % was 2,4'-diaminodiphenylmethane (MDA) and about 3 wt % was 2,2'-diaminodiphenylmethane(MDA). The polyisocyanate mixture produced from this amine mixture contained 85 wt % diisocyanatodiphenylmethane isomers and 15 wt % higher-nuclear polyisocyanates of the diphenylmethane series and had a viscosity of about 25 mPa.s at 25° C.

Polyisocyanate 2

Polyisocyanate mixture of the diphenylmethane series with a content of diisocyanatodiphenylmethane isomers (MDI) of about 90 wt %, of which 50 wt % was 4,4'-MDI, 37 wt % was 2,4'-MDI and 8 wt % was 2,2'-MDI, and with about 10 wt % higher-functional polymeric polyisocyanates of the diphenylmethane series and a viscosity of about 25 mPa.s at 25° C.

Polyisocyanate 3

Pure, distilled 4,4'-diphenylmethane diisocyanate which is commercially available under the name Desmodur 44M from Bayer AG, Germany.

Example 1

466 g Polyisocyanate 1 were charged to a three-necked flask fitted with a stirrer, dropping funnel, thermometer, and nitrogen inlet and outlet lines. Then, with stirring and under a nitrogen atmosphere, 34 g polyether polyol A were added dropwise over a period of 3 hours. After that, with further stirring, the reaction product was maintained at 60° C. for 1 hr and subsequently cooled to room temperature.

Example 2

450 g Polyisocyanate 1 were reacted with 50 g polyether polyol E using the same procedure as was used in Example 1.

Example 3

460 g Polyisocyanate 2 were reacted with 40 g polyether polyol C using the same procedure as was used in Example 1.

Example 4

450 g Polyisocyanate I were reacted with 50 g polyether polyol B using the same procedure as was used in Example 1.

Example 5

466 g Polyisocyanate 3 were reacted with 34 g polyether polyol A using the same procedure as was used in Example 1. In this case, phase-separation or crystallization occurred.

The data on the reaction products obtained from Examples 1 to 5 are listed in Table 2.

TABLE 2

| | Viscosity [mPa · s at 25° C.] | NCO content (%) |
|---|---|---|
| Example 1 | 1200 | 26.50 |
| Example 2 | 2300 | 25.60 |
| Example 3 | 850 | 23.50 |
| Example 4 | 1880 | 25.55 |
| Example 5 | 233 | 26.68 |

The prepolymers obtained in Examples 1 to 5, Polyisocyanate 1 and the polyisocyanate which is commercially available under the name Desmodur PF from Bayer AG, Germany were used to prepare rigid foam test pieces (foamed plastic samples 1 to 10).

The following formulations were used as polyol components in the foaming:

Formulation A

Polyol mixture with an OH number of 540 mg KOH/g and a viscosity of 1520 mPa.s at 25° C., consisting of 1) 98 parts by weight of a polyether polyol of OH number 550 mg KOH/g that had been obtained by reaction of trimethylolpropane with ethylene oxide and propylene oxide,
2) 1.5 parts by weight of a polyether-polyol-modified polysiloxane as foam stabilizer and
3) 0.5 parts by weight water as blowing agent.

Formulation B

Polyol mixture with an OH number of 580 mg KOH/g and a viscosity of 1780 mPa.s at 20° C., consisting of 1) 100 parts by weight of Formulation A and 2) 12 parts by weight of polyether polyol A.

To prepare the foamed plastic test pieces, 100 parts by weight of Formulation A or 112 parts by weight of Formulation B, 1.4 to 2.0 parts by weight of N,N'-dimethylcyclohexylamine as catalyst, 18 to 38 parts by weight blowing agent and 163 to 187 parts by weight of the prepolymers from Examples 1 to 5 or Polyisocyanate 1 or Desmodur PF polyisocyanate were mixed and processed to form test pieces.

In the laboratory, these test pieces were produced in known manner at 23° C. with dimensions 200 mm×200 mm×about 200 mm (demolding after about 15 min.). After 24 hours, the test pieces were cut vertically in the middle. The smallest horizontal opening was determined in order to establish the extent of shrinkage at room temperature (see Table 3).

The test results from the preparation of polyurethane rigid foams by means of the prepolymers of Examples 1–5, Polyisocyanate 1, and Desmodur PF polyisocyanate were assembled in Table 3.

TABLE 3

| Foamed plastics: | 1 | 2 | 3 | 4 | 5 | 6 | 7 | 8 | 9 | 10 |
|---|---|---|---|---|---|---|---|---|---|---|
| Composition<br>Polyol component: | | | | | | | | | | |
| Formulation A [pts. wt.] | 100 | 100 | 100 | 100 | 100 | 100 | 100 | 100 | — | 100 |
| Formulation B [pts. wt.] | — | — | — | — | — | — | — | — | 112 | — |
| Blowing agent: | | | | | | | | | | |
| R11[a] [pts. wt.] | 38 | 38 | 38 | 38 | — | — | — | 38 | 38 | 38 |
| n-Pentane [pts. wt.] | — | — | — | — | 18 | 18 | — | — | — | — |
| 1,1-Dichloro-2-fluoroethane [pts. wt.] | — | — | — | — | — | — | 31 | — | — | — |
| Catalyst[b] [pts. wt.] | 1.6 | 1.4 | 1.4 | 1.4 | 1.4 | 1.4 | 1.5 | 1.4 | 1.4 | 2.0 |
| Isocyanate component: | | | | | | | | | | |
| Prepolymer from Ex. 1 [pts. wt.] | 175 | — | — | — | 175 | — | 175 | — | — | — |
| Prepolymer from Ex. 2 [pts. wt.] | — | 175 | — | — | — | — | — | — | — | — |
| Prepolymer from Ex. 3 [pts. wt.] | — | — | 175 | — | — | 175 | — | — | — | — |
| Prepolymer from Ex. 4 [pts. wt.] | — | — | — | 175 | — | — | — | — | — | — |
| Prepolymer from Ex. 5 [pts. wt.] | — | — | — | — | — | — | — | 168 | — | — |
| Polyisocyanate 1 [pts. wt.] | — | — | — | — | — | — | — | — | 163 | — |
| *Desmodur PF [pts. wt.] | — | — | — | — | — | — | — | — | — | 187 |
| *Ratio | 108 | 106 | 108 | 106 | 108 | 108 | 108 | 105 | 107 | 103 |
| Shrinkage [%] | 0.0 | 0.0 | 0.5 | 0.0 | 0.0 | 0.0 | 0.0 | 2.5 | 3.5 | 6.0 |

*Desmodur PF: Commercial polyisocyanate available from Bayer AG, Germany
*Ratio: Ratio of the amount of isocyanate to the theoretically calculated amount of isocyanate × 100
Ex = Example
[a]trichlorofluoromethane
[b]N,N'-dimethylcyclohexylamine As can be seen from Table 3, the foamed plastics 8, 9, and 10, even at room temperature, showed definite shrinkage. Diphenylmethane-4,4'-diisocyanate (Polyisocyanate 1), Desmodur PF urethane-group-containing diphenylmethane diisocyanate (commercially available from Bayer AG; prior art), and a distilled diphenylmethane-4,4'-diisocyanate reacted with a polyether polyol of the type useful in producing the prepolymers of the present invention were not suitable as isocyanate components, because they yielded polyurethane rigid foams that were light-colored but not dimensionally stable.

Moreover, comparison of foamed plastics 1 and 9 shows that the polyether polyol must be used on the isocyanate side for the production of the prepolymers according to the invention in order that light-colored foamed plastics that do not shrink are obtained (foamed plastic 1). If the polyether polyol is used on the polyol side, foams that shrink are obtained (foamed plastic 9).

The foaming of the reaction products from formulation A and the prepolymers from Examples 1–4, on the other hand, produced dimensionally stable and light-colored polyurethane rigid foams 1–7.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A urethane-containing, diphenylmethane isocyanate prepolymer which is the reaction product of
   a) a diphenylmethane isocyanate mixture in which
      1) from about 75 to about 95 wt % binuclear isomers, with from about 15 to about 40 wt % being a 2,4'-isomer and from about 2 to about 10 wt % being a 2,2'-isomer and
      2) from about 5 to about 25 wt % polymeric isocyanate are present and
   b) a polyether polyol having a functionality of from about 3 to about 8, an OH number of from about 350 to about 1000 mg KOH/g and a molecular weight of from about 150 to about 1000.

2. A mixture of the prepolymer of claim 1 with a diphenylmethane polyisocyanate.

3. A process for the production of a urethane-containing, diphenylmethane isocyanate prepolymer comprising reacting
   a) a diphenylmethane isocyanate mixture having
      (1) from about 75 to about 95 wt % binuclear isomers in which from about 15 to about 40 wt % is a 2,4'-isomer and from about 2 to about 10 wt % is a 2,2'-isomer and
      (2) from about 5 to about 25 wt % polymeric isocyanate with
   b) 0.1–10 wt % polyether polyol having a functionality of from about 3 to about 8 with an OH number of from about 350 to about 1000 mg KOH/g and a molecular weight of from about 150 to about 1000.

4. The process of claim 3 in which from about 6 to about 8 wt % polyol b) is used.

5. The process of claim 3 in which the binuclear content of isocyanate a) is about 85 wt % and the 2,4'-isomer content is from about 20 to about 24 wt % and the 2,2'-isomer content is from about 1 to about 5 wt %.

6. A process for the production of a dimensionally stable, light-colored and tough rigid polyurethane foam comprising reacting the prepolymer of claim 1 with an isocyanate-reactive material in the presence of a blowing agent.

7. A process for the production of a dimensionally stable, light-colored and tough rigid-polyurethane foam comprising reacting the prepolymer of claim 1 with a polyether polyol in the presence of a chlorofluorocarbon blowing agent.

* * * * *